United States Patent
Zeng

(12) 
(10) Patent No.: US 11,052,860 B2
(45) Date of Patent: Jul. 6, 2021

(54) DISTRIBUTION OF GAS FOR AIRBAG INFLATION IN A VEHICLE

(71) Applicants: Hyundai Motor Company, Seoul (KR); Kia Motors Corporation, Seoul (KR)

(72) Inventor: Samuel Zeng, Superior Township, MI (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 108 days.

(21) Appl. No.: 16/409,825

(22) Filed: May 12, 2019

(65) Prior Publication Data

US 2020/0353887 A1 Nov. 12, 2020

(51) Int. Cl.
| | |
|---|---|
| *B60R 21/233* | (2006.01) |
| *B60R 21/217* | (2011.01) |
| *B60R 21/26* | (2011.01) |
| B60R 21/01 | (2006.01) |
| B60R 21/276 | (2006.01) |
| B60R 21/264 | (2006.01) |

(52) U.S. Cl.
CPC .......... *B60R 21/233* (2013.01); *B60R 21/217* (2013.01); *B60R 21/26* (2013.01); *B60R 2021/01013* (2013.01); *B60R 2021/01211* (2013.01); *B60R 2021/2642* (2013.01); *B60R 2021/26058* (2013.01); *B60R 2021/2765* (2013.01)

(58) Field of Classification Search
CPC ..... B60R 21/233; B60R 21/217; B60R 21/26; B60R 2021/01211; B60R 2021/2765

USPC ......................................................... 280/741
See application file for complete search history.

(56) References Cited

U.S. PATENT DOCUMENTS

| | | | | |
|---|---|---|---|---|
| 6,065,773 | A | * | 5/2000 | Klinger ................. B60R 21/268 |
| | | | | 222/54 |
| 6,068,288 | A | * | 5/2000 | Karolek .................. B60R 21/26 |
| | | | | 280/735 |
| 6,113,134 | A | * | 9/2000 | Lim ...................... B60R 21/217 |
| | | | | 180/282 |

(Continued)

FOREIGN PATENT DOCUMENTS

DE            19850448 A1     5/2000

*Primary Examiner* — James A English
*Assistant Examiner* — Kurtis Nielson
(74) *Attorney, Agent, or Firm* — Mintz Levin Cohn Ferris Glovsky and Popeo, P.C.; Peter F. Corless

(57) ABSTRACT

A gas distribution system for airbag inflation in a vehicle can include: a passenger airbag including a plurality of inflatable chambers; an airbag inflation device configured to produce a gas when a collision involving the vehicle is sensed and to supply the gas to the passenger airbag, causing deployment of the passenger airbag; and an inflation gas distributor disposed at least partially between the airbag inflation device and the passenger airbag, the inflation gas distributor including a rotatable distributor belt, the inflation gas distributor configured to allow passage of the gas from the airbag inflation device to a first subset of the plurality of chambers, and to impede passage of the gas from the airbag inflation device to a second subset of the plurality of chambers, by rotating the distributor belt to a gas distribution position selected among a plurality of predetermined gas distribution positions.

19 Claims, 10 Drawing Sheets

(56) References Cited

U.S. PATENT DOCUMENTS

| | | | | |
|---|---|---|---|---|
| 6,161,866 | A * | 12/2000 | Ryan | B60R 21/276 |
| | | | | 280/736 |
| 6,209,908 | B1 * | 4/2001 | Zumpano | B60N 2/286 |
| | | | | 280/729 |
| 6,349,964 | B1 | 2/2002 | Acker et al. | |
| 7,192,051 | B2 * | 3/2007 | Takahara | B60R 21/264 |
| | | | | 280/736 |
| 7,422,234 | B2 | 9/2008 | Huber et al. | |
| 9,340,176 | B2 | 5/2016 | Belwafa et al. | |
| 10,160,417 | B2 * | 12/2018 | Malapati | B60R 21/264 |
| 2002/0027338 | A1 * | 3/2002 | Matsumoto | B60R 21/26 |
| | | | | 280/730.1 |
| 2003/0155750 | A1 * | 8/2003 | Hu | B60R 21/013 |
| | | | | 280/730.1 |
| 2017/0232919 | A1 * | 8/2017 | Miyata | B60R 21/0136 |
| | | | | 701/45 |
| 2017/0282827 | A1 * | 10/2017 | Choi | B60R 21/0136 |
| 2018/0229683 | A1 * | 8/2018 | Anvari | B60R 21/0132 |

\* cited by examiner

DISTRIBUTION OF GAS FOR AIRBAG INFLATION IN A VEHICLE

TECHNICAL FIELD

The present disclosure relates generally to vehicular safety, and more particularly, to the distribution of gas for airbag inflation in a vehicle.

BACKGROUND

Federal motor vehicle safety standards in the United States are developed and enforced by the National Highway Transportation Safety Administration (NHTSA). To this end, NHTSA created the New Car Assessment Program (NCAP) which involves the administration of tests for evaluating different aspects of a vehicle's crashworthiness in hopes to encourage manufacturers to build safer vehicles. Results from these tests are compiled into a rating of one to five stars and later published for public viewing, including displaying the rating on the window sticker of new cars.

NCAP crash tests evaluate how well new vehicles protect occupants in different types of collisions. The most traditional crash test is known as a "frontal-impact crash test," whereby a vehicle is driven to collide head-on with a barrier at an angle of impact directly opposing the direction in which the vehicle travels. A load generated by colliding head-on with a barrier can be experienced throughout the entire front end of the vehicle. Thus, an occupant's head and upper body travels directly forward in response to a frontal impact crash. As shown in FIG. 1A, most conventional passenger airbags (PAB), such as airbag 110, are capable of safely absorbing the impact of the head and upper body of an occupant 100 (e.g., passenger, driver, etc.) in such a collision.

New NCAP regulations further require occupant protection in the event of an oblique frontal-impact crash. Here, the vehicle impacts a barrier at an angle that is offset from the direction in which the vehicle travels. Since only part of the vehicle front end impacts the barrier, the impact force remains approximately the same as in a frontal-impact test, but a smaller fraction of the vehicle is required to absorb the force. An "oblique" collision can occur whenever a vehicle impacts another object at an angle offset from the vehicle's direction of travel (i.e., a non-frontal-impact-type collision), such as an errant vehicle veering into oncoming traffic and striking another car.

Notably, in oblique frontal collisions, where the primary loading is not experienced throughout the entire front end of the vehicle, the lateral acceleration of the collision will cause an occupant 100 to move toward the Principal Direction of Force (PDOF), causing both forward and lateral motion of the occupant 100. If the PDOF is far enough off-center (e.g., 15°), the occupant 100 may load the traditional frontal restraints (e.g., airbag system) in a manner not represented in current regulatory testing. As shown in FIG. 1B, recent oblique collision testing has shown that conventional passenger airbags, such as airbag 110, fail to adequately protect an occupant 100 moving simultaneously in forward and lateral directions, resulting in the occupant's head sliding off the airbag 110 or moving through an outer edge of the airbag 110 (where cushion is minimal), and striking the dash panel.

One approach for improving oblique impact protection involves installing a passenger airbag with a larger volume so occupant interaction with the airbag can accommodate for oblique outboard or inboard movement of the occupant's head and upper body. Problematically, as the airbag increases in volume, so too must the airbag inflator increase in output. Airbag inflators capable of larger outputs are costly and capable of producing additional safety concerns for the occupant.

SUMMARY

The present disclosure provides an inflation gas distributor for inflation of a multi-chambered passenger airbag in a vehicle. The inflation gas distributor can include a rotatable distributor belt through which the inflation gas distributor can allow passage of gas from an airbag inflation device (i.e., airbag inflator) to a first subset of the airbag chambers and impede passage of the gas to a second subset of the airbag chambers. In some embodiments, the inflation gas distributor can distribute the gas supplied from the airbag inflation device in the event of a collision directly to chambers of the passenger airbag proximate to a location of the collision. As a result, it is possible to directly deploy only the airbag chambers closest to the collision location, allowing the airbag to provide enhanced protection during an oblique collision in which the occupant moves in forward and lateral directions, as shown in FIG. 1B.

According to embodiments of the present disclosure, a gas distribution apparatus for airbag inflation in a vehicle, which includes a passenger airbag with a plurality of inflatable chambers, each respective chamber having a chamber inlet in fluid communication with an interior of the respective chamber, can include: an inflation gas distributor disposed at least partially between the passenger airbag and an airbag inflation device that is configured to produce a gas when a collision involving the vehicle is sensed and to supply the gas to the passenger airbag, causing deployment of the passenger airbag, the inflation gas distributor including a rotatable distributor belt; and a control unit in operative communication with the inflation gas distributor and a plurality of collision sensors disposed in or around the vehicle. The inflation gas distributor can be configured to allow passage of the gas from the airbag inflation device to a first subset of the plurality of chambers, and to impede passage of the gas from the airbag inflation device to a second subset of the plurality of chambers, by rotating the distributor belt to a gas distribution position selected among a plurality of predetermined gas distribution positions. The control unit can be configured to select the gas distribution position among the plurality of predetermined gas distribution positions based on collision data relating to the collision acquired by the plurality of collision sensors, and to control operation of the inflation gas distributor, causing the rotation of the distributor belt to the selected gas distribution position.

The inflation gas distributor can be configured to allow the passage of the gas from the airbag inflation device to the first subset of chambers by creating one or more flow paths between the airbag inflation device and the chamber inlet of each chamber in the first subset of chambers through the distributor belt, and to impede the passage of the gas from the airbag inflation device to the second subset of chambers by blocking one or more flow paths between the airbag inflation device and the chamber inlet of each chamber in the second subset of chambers through the distributor belt.

The distributor belt can include one or more vents formed therein. Further, the distributor belt can be configured to rotate such that the one or more vents are aligned with the chamber inlet of each chamber in the first subset of chambers, thereby creating the one or more flow paths between the airbag inflation device and the chamber inlet of each chamber in the first subset of chambers, and such that a portion of the distributor belt without a vent formed therein is aligned with the chamber inlet of each chamber in the second subset of chambers, thereby blocking the one or more flow paths between the airbag inflation device and the chamber inlet of each chamber in the second subset of chambers.

The inflation gas distributor can further include one or more pistons operatively coupled to the distributor belt, the one or more pistons configured to cause the rotation of the distributor belt.

Also, the inflation gas distributor can further include an airbag connector at least partially surrounding the distributor belt, such that the distributor belt is at least partially sandwiched between the airbag connector and the airbag inflation device, the airbag connector connecting to the plurality of chambers of the passenger airbag.

The airbag connector can include a plurality of chamber receptacles, each of which configured to receive one chamber of the plurality of chambers. The plurality of chambers can be disposed in the airbag connector such that the chamber inlet of each of the plurality of chambers is positioned so as to receive the gas from the airbag inflation device.

The distributor belt can include one or more vents formed therein. Further, the inflation gas distributor can be configured to allow passage of the gas from the airbag inflation device to the first subset of chambers and to impede passage of the gas from the airbag inflation device to the second subset of the plurality of chambers, by rotating the distributor belt such that each chamber receptacle containing a chamber in the first subset of chambers is aligned with a vent of the one or more vents, and such that each chamber receptacle containing a chamber in the second subset of chambers is aligned with a portion of the distributor belt without a vent formed therein.

The plurality of chamber receptacles can be arranged in a 1×n array, where n is two or more, and the inflation gas distributor can further include one or more pistons operatively coupled to the distributor belt, the one or more pistons configured to cause movement of the distributor belt in an x-direction only. Alternatively, the plurality of chamber receptacles can be arranged in a m×n array, where m is two or more, and n is two or more, and the inflation gas distributor can further include one or more pistons operatively coupled to the distributor belt, the one or more pistons configured to cause movement of the distributor belt in an x-direction and a y-direction.

The airbag connector can be configured to remain stationary during the rotation of the distributor belt.

The control unit can be configured to actuate one or more pistons operatively coupled to the distributor belt so as to cause the rotation of the distributor belt to the selected gas distribution position.

The plurality of predetermined gas distribution positions can include: a first gas distribution position in which the inflation gas distributor allows passage of the gas from the airbag inflation device to one or more chambers including a chamber disposed in a middle location among the plurality of chambers, a second gas distribution position in which the inflation gas distributor allows passage of the gas from the airbag inflation device to one or more chambers including a chamber disposed in a leftmost location among the plurality of chambers, and a third gas distribution position in which the inflation gas distributor allows passage of the gas from the airbag inflation device to one or more chambers including a chamber disposed in a rightmost location among the plurality of chambers.

The control unit can be configured to select the first gas distribution position when the collision data acquired by the plurality of collision sensors indicates that a frontal collision has occurred, to select the second gas distribution position when the collision data acquired by the plurality of collision sensors indicates that a front-left oblique collision has occurred, and to select the third gas distribution position when the collision data acquired by the plurality of collision sensors indicates that a right-left oblique collision has occurred.

Each of the predetermined gas distribution positions can correspond to a unique configuration of the first subset of the plurality of chambers and the second subset of the plurality of chambers.

The inflation gas distributor can be configured to control the gas supplied from the airbag inflation device such that only the first subset of chambers is directly inflated by the airbag inflation device.

The second subset of chambers can be indirectly inflated by the airbag inflation device due to flow of the gas from the first subset of chambers through one or more vents disposed between the plurality of chambers to the second subset of chambers.

The distributor belt can include one or more vents formed therein, through which the gas passes from the airbag inflation device to the first subset of the plurality of chambers, and a total number of chambers of the plurality of chambers can be greater than a total number of vents of the one or more vents.

When the first subset of chambers is deployed, due to passage of the gas from the airbag inflation device to the first subset of the plurality of chambers, a deployment location of the first subset of chambers can correspond to a location of the collision with respect to the vehicle.

Furthermore, in accordance with embodiments of the present disclosure, a gas distribution method for airbag inflation in a vehicle, which includes a passenger airbag with a plurality of inflatable chambers, each respective chamber having a chamber inlet in fluid communication with an interior of the respective chamber, can include: sensing a collision involving the vehicle using a plurality of sensors disposed in or around the vehicle, upon which an airbag inflation device produces a gas and supplies the gas to the passenger airbag, causing deployment of the passenger airbag; acquiring collision data relating to the collision using the plurality of sensors; selecting a gas distribution position among a plurality of predetermined gas distribution positions based on the acquired collision data; and controlling operation of an inflation gas distributor disposed at least partially between the airbag inflation device and the passenger airbag, causing rotation of a distributor belt to the selected gas distribution position, such that the inflation gas distributor allows passage of the gas from the airbag inflation device to a first subset of the plurality of chambers, and impedes passage of the gas from the airbag inflation device to a second subset of the plurality of chambers.

Furthermore, in accordance with embodiments of the present disclosure, a gas distribution system for airbag inflation in a vehicle can include: a passenger airbag for use in the vehicle, the passenger airbag including a plurality of inflatable chambers, each respective chamber having a chamber inlet in fluid communication with an interior of the respective chamber; an airbag inflation device configured to produce a gas when a collision involving the vehicle is sensed and to supply the gas to the passenger airbag, causing deployment of the passenger airbag; an inflation gas distributor disposed at least partially between the airbag inflation device and the passenger airbag, the inflation gas distributor including a rotatable distributor belt, the inflation gas distributor configured to allow passage of the gas from the airbag inflation device to a first subset of the plurality of chambers, and to impede passage of the gas from the airbag inflation device to a second subset of the plurality of chambers, by rotating the distributor belt to a gas distribution position selected among a plurality of predetermined gas distribution positions; and a control unit in operative communication with the inflation gas distributor and a plurality of collision sensors disposed in or around the vehicle, the control unit configured to select the gas distribution position among the plurality of predetermined gas distribution positions based on collision data relating to the collision acquired by the plurality of collision sensors, and to control operation of the inflation gas distributor, causing the rotation of the distributor belt to the selected gas distribution position.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1A:
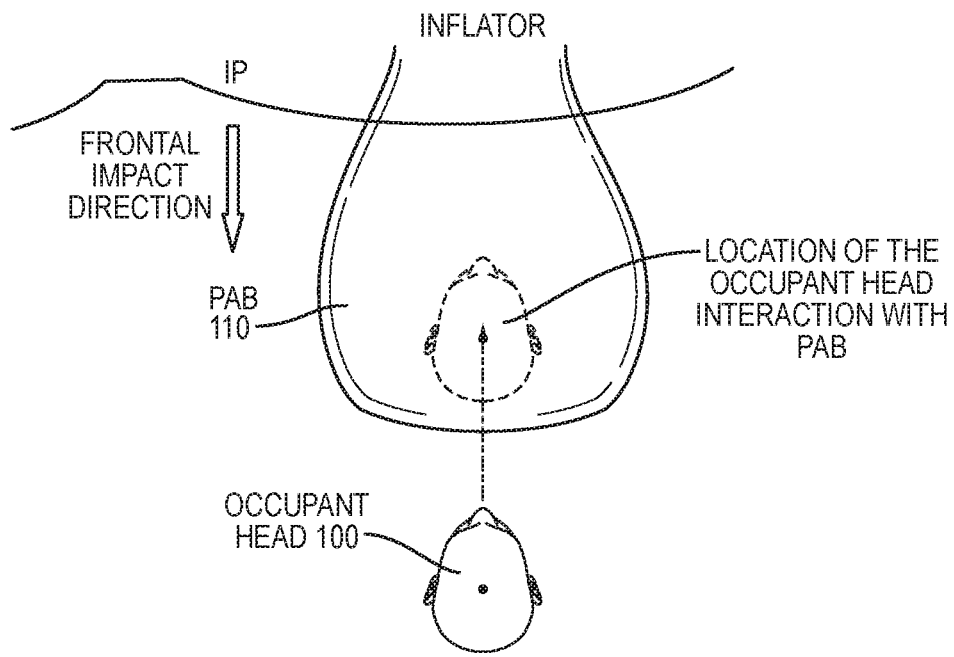
FIGS. 1A and 1B are simplified top views of conventional airbag deployment in a frontal-impact crash and an oblique frontal-impact crash, respectively.
Figure 1B:
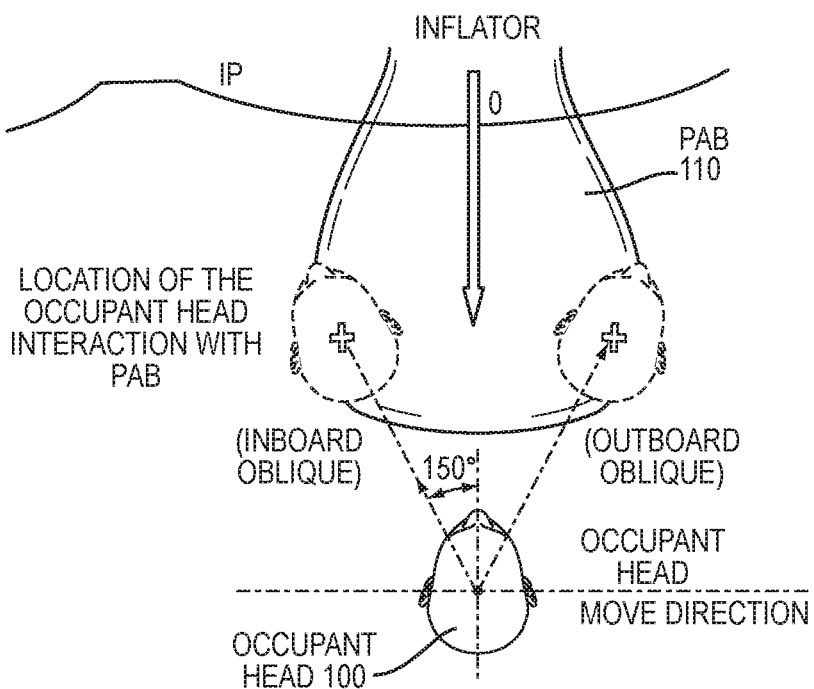

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, devices, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to embodiments of the present disclosure, the safety of a vehicle occupant (e.g., passenger, driver, etc.) can be enhanced by directly deploying a specific subset of chambers in a multi-chambered passenger airbag based on a type or location of a collision, e.g., front driver-side impact, front passenger-side impact, etc. The inflation gas distributor, described in detail herein, can control the flow of gas supplied from an airbag inflation device (i.e., airbag inflator) such that the gas flows directly to the subset of airbag chambers to be deployed, without flowing directly to the remaining chambers, thereby resulting in a more efficient deployment of the airbag chambers most necessary for supporting the occupant, especially a laterally moving occupant in the event of an oblique frontal-impact collision.

Figure 2:
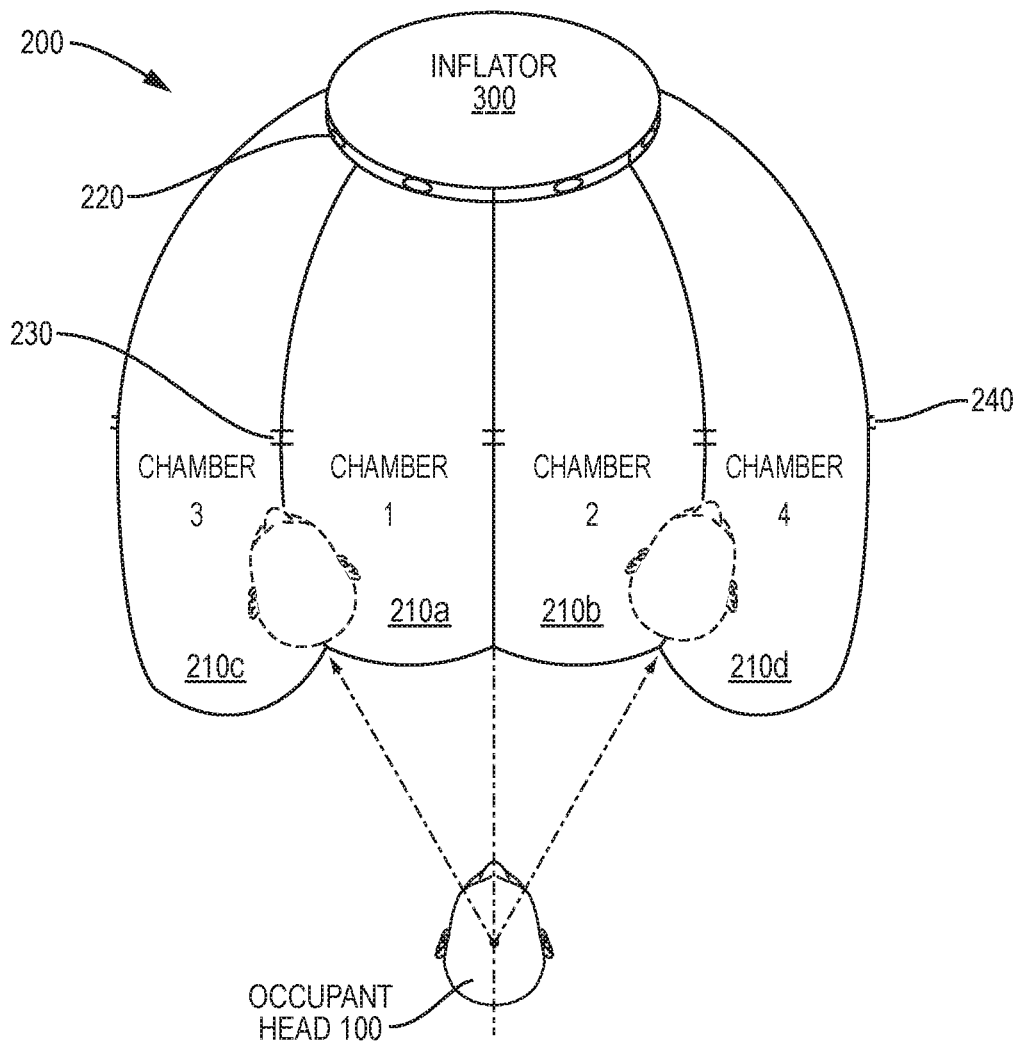
FIG. 2 is a simplified top view of an exemplary multi-chambered passenger airbag.

FIG. 2 is a simplified top view of an exemplary multi-chambered passenger airbag. As shown in FIG. 2, the passenger airbag 200 may be disposed in a vehicle to provide cushion for the occupant's head and upper body in the event of a collision. When a collision involving the vehicle is sensed (by one or more collision sensors, for example), the passenger airbag 200 can be deployed to provide an energy absorbing surface for the occupant, who moves in a direction due to forces of the collision, preventing the occupant 100 from directly striking objects in the vehicle interior, such as the steering wheel, dashboard, windshield, and the like.

In a frontal-impact or head-on collision, the occupant 100 can move in a substantially forward direction. Conventional passenger airbags are designed for primary loading to occur toward the center of the airbag. Thus, conventional passenger airbags typically provide ample support for the occupant 100 when the head is moving forward only.

On the other hand, in a frontal-impact oblique collision, in which the vehicle collides with another object at an angle that is offset from the direction in which the vehicle is travelling, the occupant can be propelled both forward and laterally, either inboard or outboard. In such situation, the conventional passenger airbag does not provide sufficient support for the head of the occupant 100 since only an outer periphery of the airbag supports the body of the occupant 100, where less support is provided than at a middle portion of the airbag. When a load is applied to the airbag outside of the central area, greater forward displacement of the occupant 100 is allowed to occur. Consequently, if forces caused by the collision are severe, the upper body (e.g., head, neck, chest, etc.) of the occupant 100 may travel through the airbag and strike the dashboard. Or, the upper body of the occupant 100 may slide off the airbag and strike the dashboard directly.

In the present case, a passenger airbag 200 can be a multi-chambered passenger airbag provided with a plurality of inflatable chambers 210. Herein, the plurality of chambers can be referenced collectively as chambers 210, or individually as chamber 210a, chamber 210b, chamber 210c, chamber 210d, and so on. Each respective chamber 210 can include a chamber inlet 220 in fluid communication with an interior of the respective chamber 210. Thus, each chamber 210 can be independently inflatable by way of receiving gas via the inlet 220 of the respective chamber 210.

Each chamber 210 can be attached to a chamber adjacent thereto, as demonstrated in FIG. 2. Furthermore, one or more internal vents (i.e., orifices) 220 can be disposed between each of the chambers 210. Gas supplied to a particular chamber 210 can flow through an internal vent 230 to another chamber 220 adjacent thereto. Thus, gas for inflation of the passenger airbag 200 can enter a particular chamber 210 via the inlet 220 of the chamber 210 (from an airbag inflation device) and/or an internal vent 230 disposed on the chamber 210 (from an adjacent chamber).

Furthermore, one or more external vents 240 can be disposed on the outer chambers 210c and 210d. Thus, gas supplied to the chambers 210 in the event of a collision is able to dissipate via the external vents 240 to the environment, allowing the passenger airbag 200 to deflate after deployment. The one or more external vents 240 can be small such that the vent exhausts a smaller amount inflation gas and/or controllable so the vent opens only as soon as the occupant interaction with deployed airbag 200.

Figure 3:
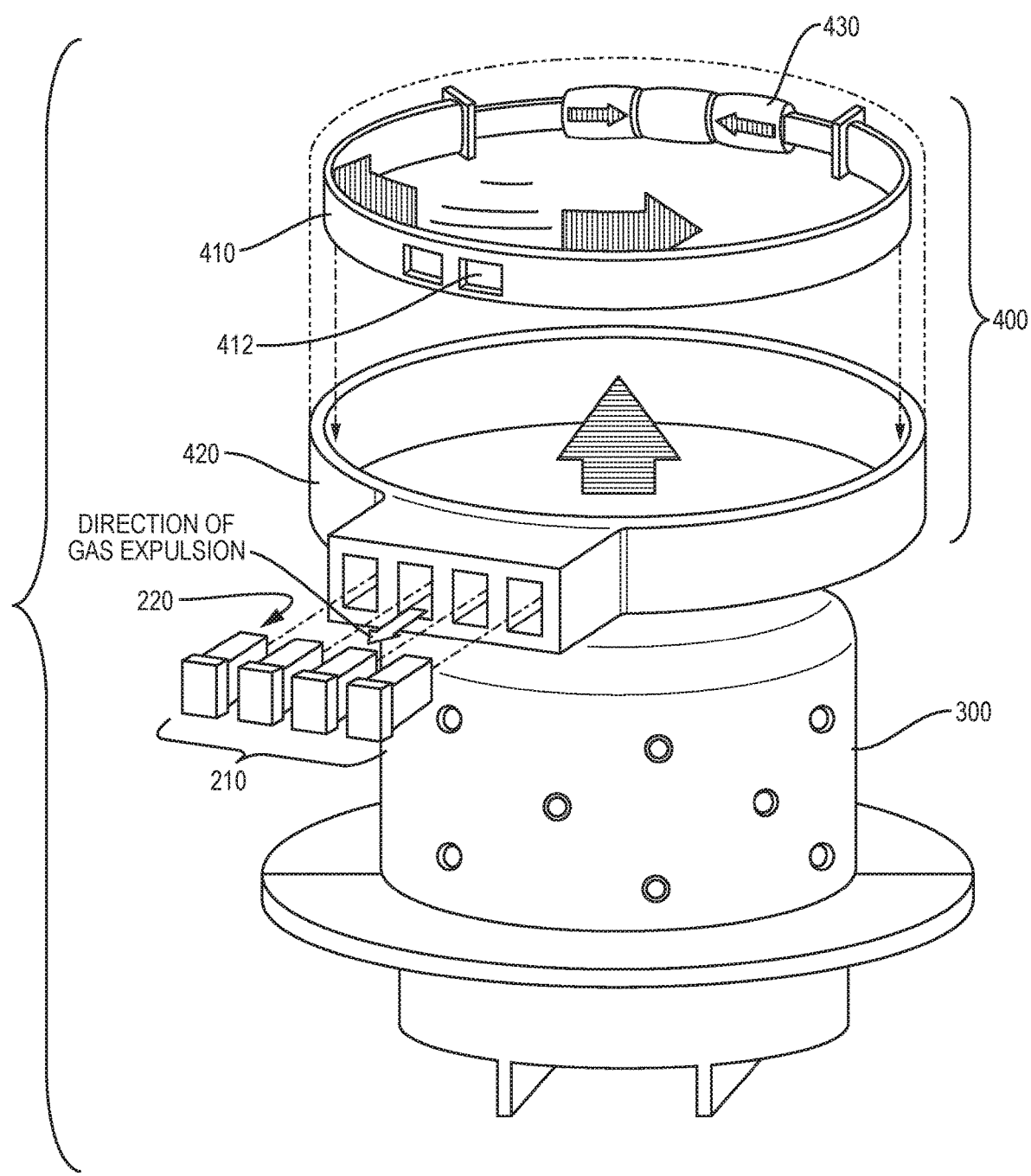
FIG. 3 is an exploded view of an airbag inflation device and an exemplary inflation gas distributor.

It is understood that the multi-chambered passenger airbag 200 may be configured in various manners, and is not limited to the configuration depicted in FIG. 3 and described herein. For instance, the passenger airbag 200 can include any plural number of chambers 210, and such chambers 210 can be arranged in any suitable manner, such as a linear or parallel formation (e.g., a 1×n array of chambers, where n is two or more), a stacked formation (e.g., a m×n array of chambers, where each of m and n is two or more), and so on, in accordance with the desired location(s) of protection. Furthermore, although reference will be made herein primarily to a single passenger airbag including multiple chambers, the inflatable chambers themselves can be considered as individual airbags connected to each other in the same manner.

The passenger airbag 200 may be deployed from a compartment in the vehicle dashboard, or the like, using an airbag inflation device (i.e., airbag inflator) 300 which rapidly inflates the chambers 210 of the airbag 200 once a collision sensor (not shown) disposed in or around the vehicle senses a collision. The airbag inflation device 300 can be variously configured to produce gas for inflation of the airbag 200. In some embodiments, the airbag inflation device 300 can produce the inflation gas in the event of a collision by igniting a chemical explosive, such as a solid propellant, in response to an electric current passing through a heating element, as is generally known in the art. The produced gas can enter rapidly into the chambers 210 through the chamber inlets 220, which are positioned so as to receive the inflation gas expelled from the airbag inflation device 300, thereby causing the passenger airbag 200 to deploy (i.e., expand).

FIG. 3 is an exploded view of the airbag inflation device 300 and an exemplary inflation gas distributor 400. As shown in FIG. 300, the airbag inflation device 300 can be disposed at least partially inside of an inflation gas distributor 400 which can function to distribute the gas produced by the airbag inflation device 300 for inflation of the passenger airbag 200 to one or more specific chambers 210 of the airbag 200. As described in greater detail below, upon a collision involving the vehicle, the inflation gas distributor 400 can direct the gas produced by the airbag inflation device 300 to one or more specific chambers 210 of the airbag 200 based upon a location or a type of the collision. For example, if the vehicle is involved in an oblique frontal-impact crash, where the impact is experienced on the vehicle's front passenger side, the inflation gas distributor 400 can control the flow of gas produced by the airbag inflation device 300 by allowing passage of the gas to the rightmost (passenger-side) chambers 210 and impeding passage of the gas to the leftmost (driver-side) chambers 210. Consequently, only the chambers 210 of the airbag 200 located on the passenger-side of the vehicle can be directly inflated (the driver-side chambers 210 can be indirectly inflated), thereby enhancing the airbag's passenger-side protection for the occupant 100.

The inflation gas distributor 400, which can be disposed at least partially between the airbag inflation device 300 and the passenger airbag 200, can include a rotatable distributor belt 410. The distributor belt 410 can be annularly shaped, as demonstrated in FIG. 3, and can move (or rotate) in at least one plane. In some embodiments, the distributor belt 410 can be designed to move in a single plane, such as along the x-axis, i.e., a positive x-direction and a negative (opposite) x-direction, as shown in FIG. 3. In other embodiments, the distributor belt 410 can be designed to move multiple planes, such as along the x- and y-axes, i.e., the positive and negative x-direction as well as a positive and negative y-direction, as described later with reference to FIG. 8. The distributor belt 410 can be formed of various materials, such as steel or other rigid materials.

The inflation gas distributor 400 can effect the rotation of the distributor belt 410 using one or more pistons 430 operatively coupled to the distributor belt 410. In some embodiments, the distributor belt 410 can be equipped with dual pistons 430. One piston 430, upon actuation thereof, can cause movement of the distributor belt 410 in a particular direction, such as the positive x-direction, while the other piston 430, upon actuation thereof, can cause movement of the distributor belt 410 in the opposite direction, i.e., negative x-direction. Additional pistons 430 can be added to the distributor belt 410 depending on the desired directions of motion. For instance, the distributor belt 410 can be equipped with a configuration of pistons 430 to enable movement of the distributor belt 410 in multiple planes, as described later with reference to FIG. 8.

The distributor belt 410 can be formed with one or more vents (or openings) 412 through which gas produced by the airbag inflation device 300 can flow into the chamber inlets 220 of the chambers 210 of the passenger airbag 200. While the one or more vents 412 formed in the distributor belt 410 may be referenced herein in its plural form (i.e., "vents 412") for the purpose of simplicity, it is understood that the one or more vents 412 may include only a single vent.

The distributor belt 410 can be rotated such that the vents 412 are aligned with chamber inlets 220 of particular chambers 210. The gas produced by the airbag inflation device 300 can flow through the vents 412, as noted above, to the particular chambers 210 such that said chambers 210 are directly inflated by airbag inflation device 300. Conversely, the distributor belt 410 can block the chamber inlets 220 of the remaining chambers 210, which are not in alignment with the vents 412, such that gas does not flow directly from the airbag inflation device 300 to the remaining chambers 210.

In some embodiments, the total number of chambers 210 of the passenger airbag 200 can be greater than the total number of vents 412 formed in the distributor belt 410, as shown in FIG. 3. As a result, when the gas produced by the airbag inflation device 300 flows through the vents 412 to the airbag 200, only a subset of the chambers 210 (i.e., "first subset of chambers") can be directly inflated, as described in further detail below. Although the remaining chambers 210 (i.e., "second subset of chambers") can be indirectly inflated by gas flowing into the remaining chambers 210 via one or more internal vents 230 (e.g., see FIG. 2), deployment of the directly inflated chambers 210 can occur more rapidly than that of the indirectly inflated remaining chambers 210, thus providing enhanced protection at the first subset of chambers in the event of a collision.

Operationally, the distributor belt 410 can allow the passage of gas from the airbag inflation device 300 to a first subset of the chambers 210 by creating one or more flow paths between the airbag inflation device 300 and the chamber inlet 220 of each chamber in the first subset of chambers 210. More specifically, the distributor belt 410 can be rotated so that the vents 412 are aligned with the chamber inlet 220 of each chamber in the first subset of chambers 210, thereby creating the one or more flow paths between the airbag inflation device 300 and the chamber inlet 220 of each chamber in the first subset of chambers 210.

Conversely, the distributor belt 410 can impede the passage of gas from the airbag inflation device 300 to a second subset of the chambers 210 by blocking one or more flow paths between the airbag inflation device 300 and the chamber inlet 220 of each chamber in the second subset of chambers 210. More specifically, the distributor belt 410 can be rotated so that one or more portions of the distributor belt 410 without a vent formed therein are aligned with the chamber inlet 220 of each chamber in the second subset of chambers 210, thereby blocking the one or more flow paths between the airbag inflation device 300 and the chamber inlet 220 of each chamber in the second subset of chambers 210.

As a result, the airbag inflation device 300 can directly inflate only the first subset of chambers 210, whereas the second subset of chambers 210 can be indirectly inflated by gas exhausted thereto from the first subset of chambers 210 via one or more internal vents 230, resulting in enhanced deployment of the first subset of chambers 210. The number and position of chambers 210 in the first (directly inflated) subset of chambers and the second (indirectly inflated) subset of chambers can change according to the desired location of passenger protection, as described further below.

Figure 4:
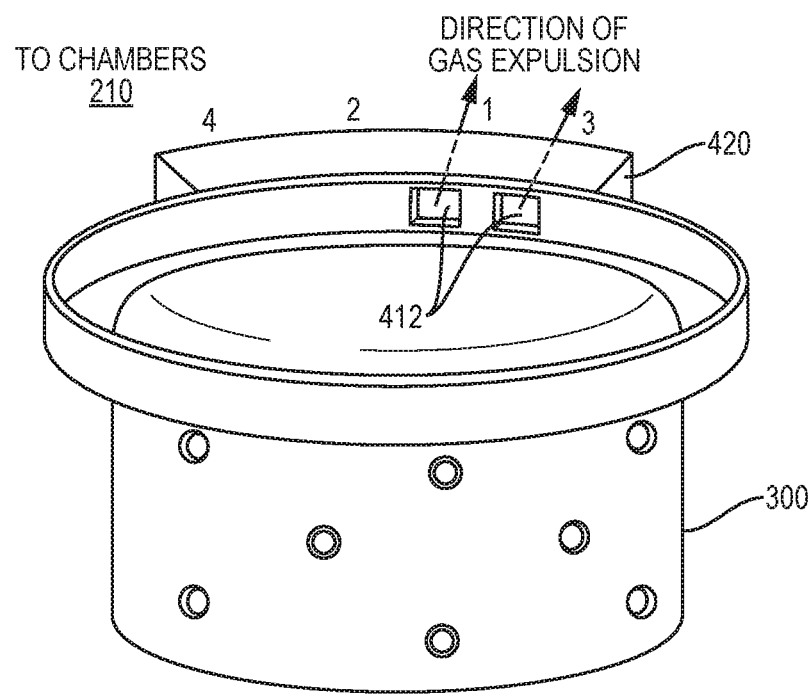
FIG. 4 is a rear, assembled view of the airbag inflation device and inflation gas distributor of FIG. 3.

In one example, as shown in FIG. 4 which illustrates a rear, assembled view of the airbag inflation device 300 and inflation gas distributor 400, the distributor belt 410 can be formed with two vents 412 through which gas produced by the airbag inflation device 300 can flow to the chambers 210. The passenger airbag 200 can include four inflatable chambers 210 (i.e., 210*a*, 210*b*, 210*c*, and 210*d*). Here, the distributor belt 410 can be rotated such that the vents 412 create flow paths between the airbag inflation device 300 and the chamber inlets 220 of chamber 1 (210*a*) and chamber 3 (210*c*). Thus, the first subset of chambers 210 can consist of chamber 1 (210*a*) and chamber 3 (210*c*), as they are directly inflated by the airbag inflation device 300.

Conversely, portions of the distributor belt 410 without a vent formed therein can block flow paths between the airbag inflation device and the chamber inlets 220 of chamber 2 (210*b*) and chamber 4 (210*d*). Thus, the second subset of chambers 210 can consist of chamber 2 (210*b*) and chamber 4 (210*d*), as they are not directly inflated by the airbag inflation device 300. Instead, chamber 2 (210*b*) and chamber 4 (210*d*) can be indirectly inflated by gas exhausted thereto from chamber 1 (210*a*) and chamber 3 (210*c*) via one or more internal vents 230 disposed between chamber 1 (210*a*) and chamber 2 (210*b*), as well as one or more internal vents 230 disposed between chamber 2 (210*b*) and chamber 4 (210*d*).

The inflation gas distributor 400 can further include an airbag connector 420 that is connected to the plurality of chambers 210 of the passenger airbag 200. The airbag connector 420 can be positioned so as to at least partially surround the distributor belt 410. Thus, the distributor belt 410 can be at least partially sandwiched between the airbag connector 420 and the airbag inflation device 300, as shown in FIG. 3.

Figure 5:
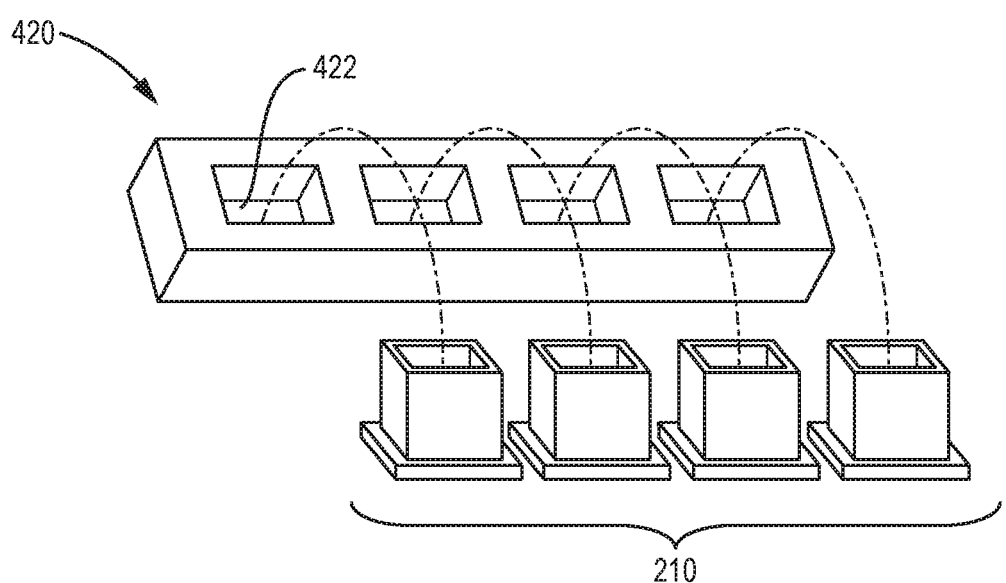
FIG. 5 is an isolated view of an exemplary airbag connector of the inflation gas distributor of FIG. 3.

In greater detail, FIG. 5 is an isolated view of the airbag connector 420. The airbag connector 420 can include a plurality of chamber receptacles 422, each of which shaped to receive one chamber of the plurality of chambers 210. Each chamber receptacle 422 can include a passage which extends through the airbag connector 420 from one end at which the chambers 210 are inserted to the other, opposite end adjacent to the distributor belt 410.

As shown in FIG. 5, the airbag connector 420 can be can be annularly shaped. In some embodiments, the airbag connector 420 and distributor belt 410 can be formed concentrically, where the distributor belt 410 is shaped to fit at least partially inside the airbag connector 420. Furthermore, the airbag connector 420 can be fixedly connected to the airbag inflation device 300 or to some other vehicle component. Thus, the airbag connector 420 can remain stationary during the rotation of the distributor belt 410.

The plurality of chambers 210 can be disposed in the chamber receptacles 422 of the airbag connector 420 so that the chamber inlet 220 of each of the plurality of chambers 210 is positioned so as to receive the gas from the airbag inflation device 300. Accordingly, the distributor belt 410 can be rotated such that each chamber receptacle 422 containing a chamber 210 in the first subset of chambers is aligned with one of the vents 412. Then, gas produced by the airbag inflation device 300 can flow directly therefrom to the chamber inlets 220 of the first subset of chambers 210, respectively, through the vents 412. Furthermore, in this position, each chamber receptacle 422 containing a chamber 210 in the second subset of chambers is aligned with a portion of the distributor belt 410 without a vent 412 formed therein. Thus, the gas produced by the airbag inflation device 300 can be unable to flow directly therefrom to the second subset of chambers 210 due to the distributor belt 410 creating a barrier between the airbag inflation device 300 and the chamber inlets 220 of the second subset of chambers 210, respectively.

Figure 6:
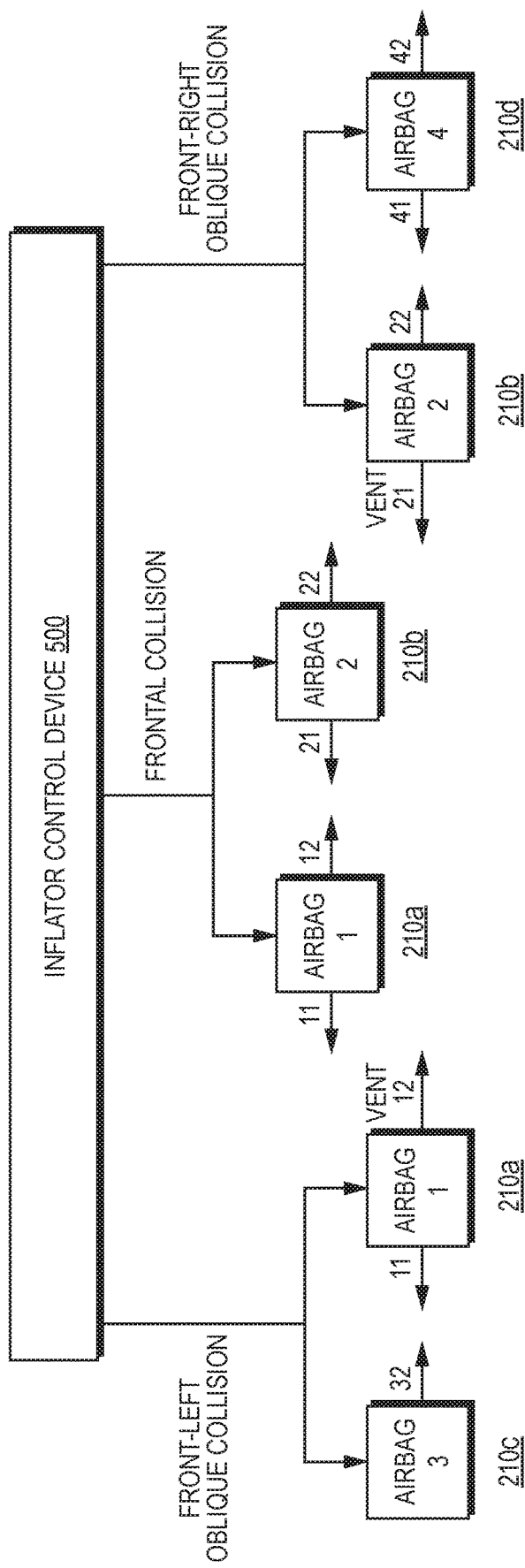
FIG. 6 is a diagrammatic view of exemplary control logic for operating the inflation gas distributor of FIG. 3.

Operation of the inflation gas distributor 200 can be controlled by a control unit 500 (e.g., electronic control unit (ECU)) disposed in the vehicle. In this regard, FIG. 6 is a diagrammatic view of exemplary control logic for operating the inflation gas distributor 300. As demonstrated in FIG. 6, the control unit 500 can be in operative communication with the inflation gas distributor 300, as well as a plurality of collision sensors (not shown) disposed in or around the vehicle. When a collision is sensed by one or more of the collision sensors, the control unit 500 can receive collision data relating to the collision acquired by the plurality of collision sensors. The collision data can indicate various information relating to the collision including, for example, the location of the collision. Based on such collision data, the control unit 500 can select a gas distribution position, in which the distributor belt 210 is rotated to allow the flow of inflation gas from the airbag inflation device 300 to particular chambers 210 of the passenger airbag 200, among a plurality of predetermined gas distribution positions, such as those shown in FIGS. 7 and 8 which include diagrammatic views of exemplary predetermined gas distribution positions. Each of the predetermined gas distribution positions corresponds to a unique configuration of the first (directly inflated) subset of the plurality of chambers and the second (indirectly inflated) subset of the plurality of chambers. The control unit 500 can then control operation of the inflation gas distributor 200, causing the rotation of the distributor belt 210 to the selected gas distribution position.

Figure 7:
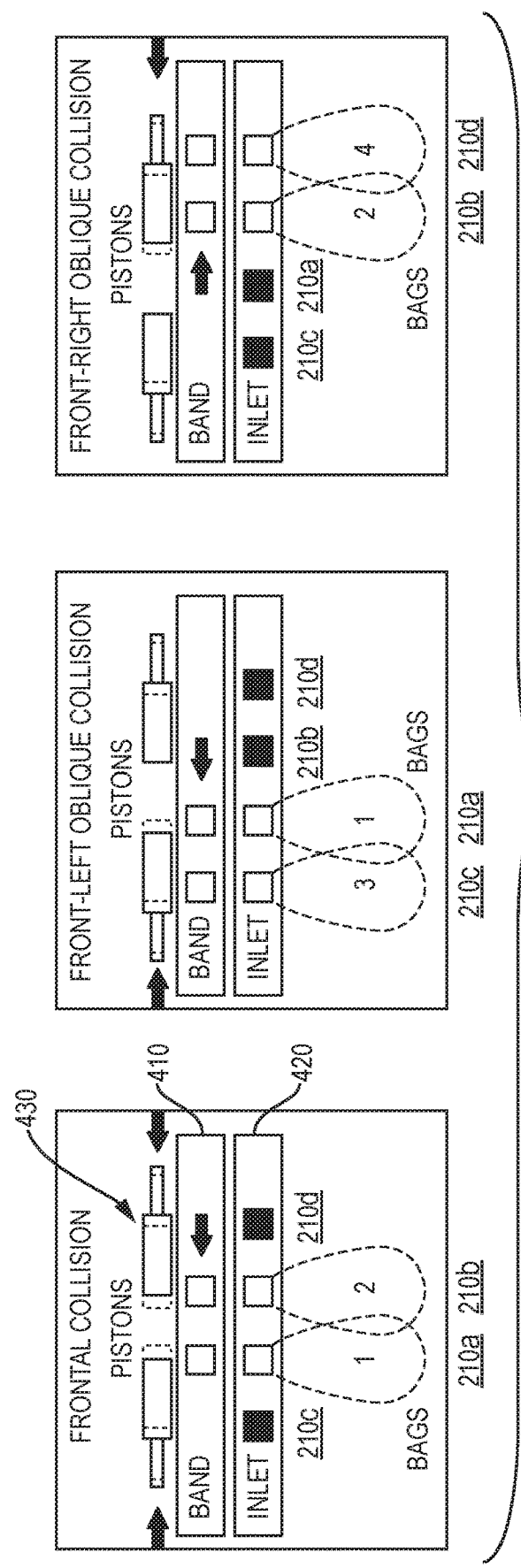
FIG. 7 includes diagrammatic views of exemplary predetermined gas distribution positions.

Various operational examples are provided in FIGS. 6 and 7. In these examples, the distributor belt 410 can be formed with two vents 412 through which gas produced by the airbag inflation device 300 can flow to the chambers 210. The passenger airbag 200 can include four inflatable chambers 210 (i.e., 210a, 210b, 210c, and 210d) arranged in a single-dimensional array and disposed in four chamber receptacles 422, respectively. As demonstrated below, the control unit 500 can control the deployment location of the chambers 210 based upon a location of the collision with respect to the vehicle.

In a first example, the control unit 500 can detect, based on collision data received from one or more sensors disposed in the vehicle, that the vehicle has experienced a front-left (i.e., driver-side) oblique collision. In response, the control unit 500 can select a "first gas distribution position" in which the leftmost chamber 210c and the left-middle chamber 210a are directly deployed to provide enhanced protection at the front-left position of the vehicle. The control unit 500 can then control the inflation gas distributor 400 (e.g., by actuating the one or more pistons 430) to effect rotation of the distributor belt 410 to the first gas distribution position, wherein the dual vents 412 of the distributor belt 410 are aligned with the chamber receptacles 422 containing the leftmost chamber 210c and the left-middle chamber 210a (i.e., the first subset of chambers), allowing gas produced by the airbag inflation device 300 to flow directly into the respective chamber inlets 220 of the leftmost chamber 210c and the left-middle chamber 210a. Meanwhile, the distributor belt 410 can act as a barrier between the respective chamber inlets 220 of the rightmost chamber 210d and the right-middle chamber 210b (i.e., the second subset of chambers) to prevent the direct inflation thereof.

In a second example, the control unit 500 can detect, based on collision data received from one or more sensors disposed in the vehicle, that the vehicle has experienced a front-right (i.e., passenger-side) oblique collision. In response, the control unit 500 can select a "second gas distribution position" in which the rightmost chamber 210d and the right-middle chamber 210b are directly deployed to provide enhanced protection at the front-right position of the vehicle. The control unit 500 can then control the inflation gas distributor 400 (e.g., by actuating the one or more pistons 430) to effect rotation of the distributor belt 410 to the second gas distribution position, wherein the dual vents 412 of the distributor belt 410 are aligned with the chamber receptacles 422 containing the rightmost chamber 210d and the right-middle chamber 210b (i.e., the first subset of chambers), allowing gas produced by the airbag inflation device 300 to flow directly into the respective chamber inlets 220 of the rightmost chamber 210d and the right-middle chamber 210b. Meanwhile, the distributor belt 410 can act as a barrier between the respective chamber inlets 220 of the leftmost chamber 210c and the left-middle chamber 210a (i.e., the second subset of chambers) to prevent the direct inflation thereof.

In a third example, the control unit 500 can detect, based on collision data received from one or more sensors disposed in the vehicle, that the vehicle has experienced a frontal (head-on) collision impacting a central area of the vehicle. In response, the control unit 500 can select a "third gas distribution position" in which the left-middle chamber 210a and the right-middle chamber 210b are directly deployed to provide enhanced protection at the central area of the vehicle. The control unit 500 can then control the inflation gas distributor 400 (e.g., by actuating the one or more pistons 430) to effect rotation of the distributor belt 410 to the third gas distribution position, wherein the dual vents 412 of the distributor belt 410 are aligned with the chamber receptacles 422 containing the left-middle chamber 210a and the right-middle chamber 210b (i.e., the first subset of chambers), allowing gas produced by the airbag inflation device 300 to flow directly into the respective chamber inlets 220 of the left-middle chamber 210a and the right-middle chamber 210b. Meanwhile, the distributor belt 410 can act as a barrier between the respective chamber inlets 220 of the leftmost chamber 210c and the rightmost chamber 210d (i.e., the second subset of chambers) to prevent the direct inflation thereof.

It is understood that the aforementioned operational examples can be modified in various ways, as would be understood by one of ordinary skill in the art, and thus do not limit the scope or the adaptability of the present disclosure.

Referring to the exemplary predetermined gas distribution positions shown in FIG. 7, the plurality of chamber receptacles 422 can be arranged in a single-dimensional array (e.g., a 1×n array, where n is two or more). Here, the one or more pistons 430 can be positioned in a single plane to cause movement of the distributor belt 410 in an x-direction only, including movement in the positive x- and negative x-direction (e.g., left and right).

Figure 8:
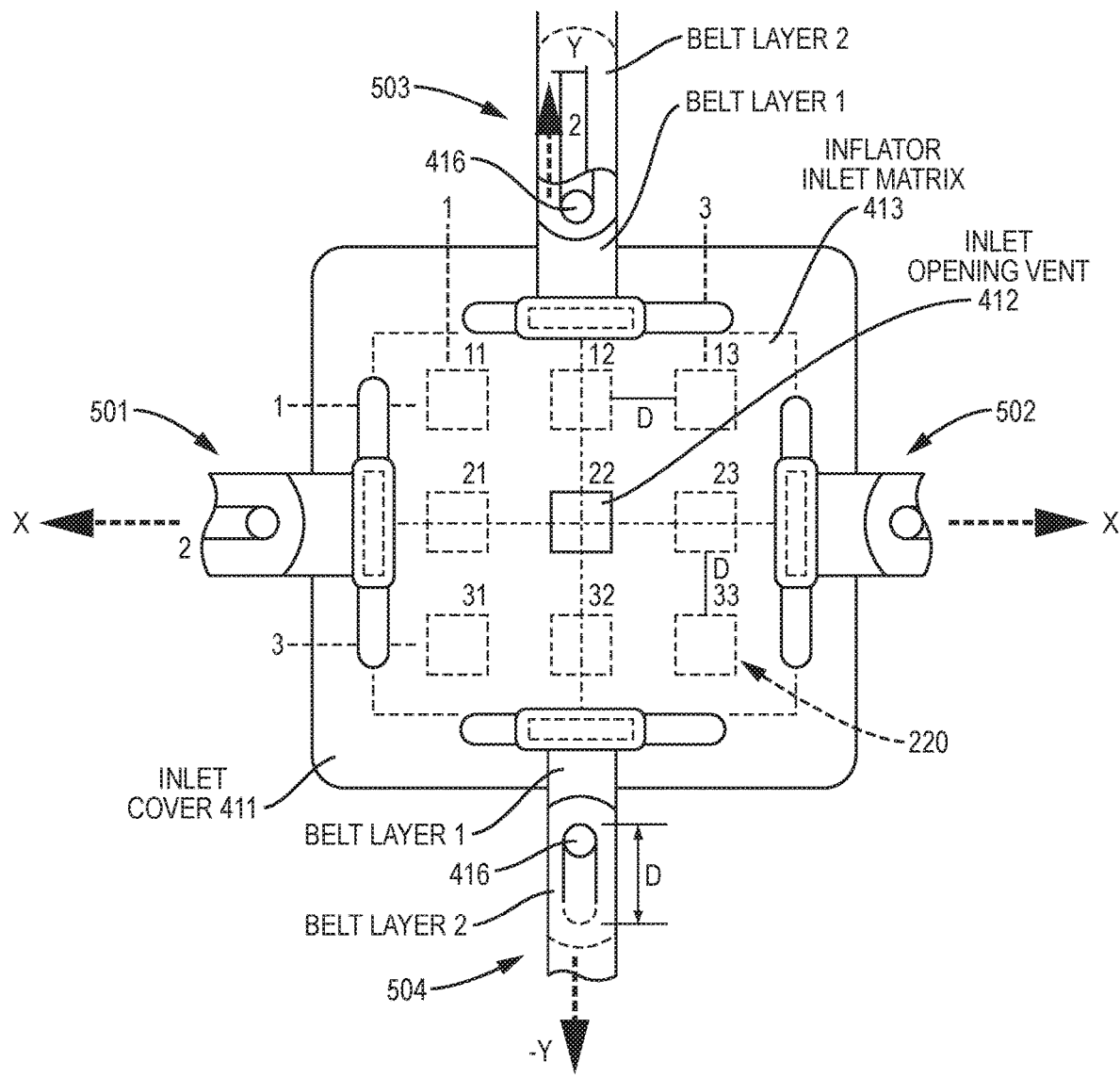
FIG. 8 is a view of the airbag inflation device including diagrammatic views of additional exemplary predetermined gas distribution positions.

Meanwhile, FIG. 8 is a view of the airbag inflation device including diagrammatic views of additional exemplary predetermined gas distribution positions. As shown in FIG. 8, the plurality of chamber receptacles 422 can be arranged in a multi-dimensional array (e.g., an m×n array, where m is two or more, and n is two or more). An additional number of pistons 430 can be required to support the operability of such configuration. Thus, a plurality of pistons 430 can be positioned in dual planes to cause movement of the distributor belt 410 in the x-direction and a y-direction, including movement in the positive x- and negative x-direction (e.g., left and right) and in the positive y- and negative y-direction (e.g., up and down).

Figure 9:
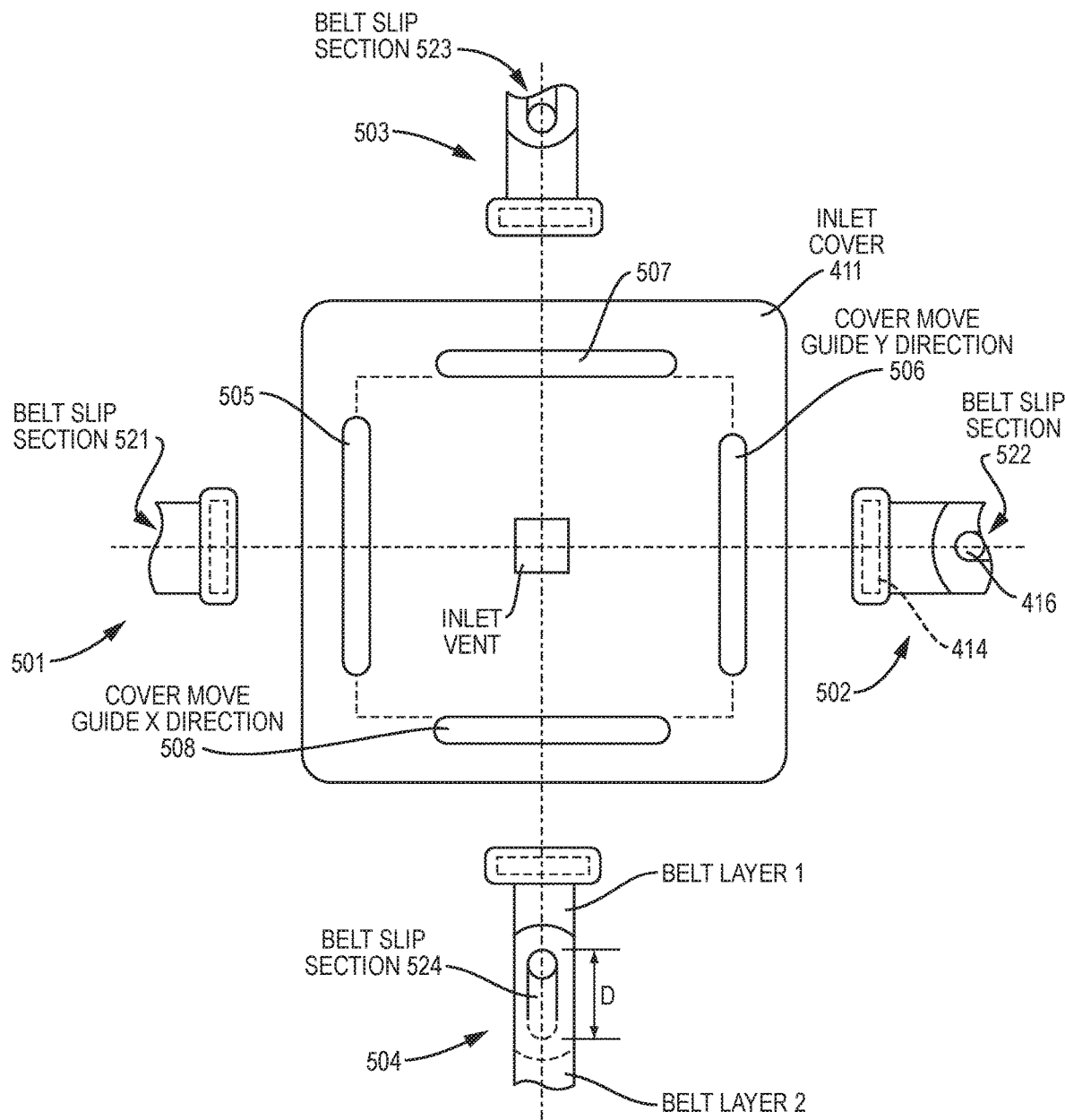
FIG. 9 illustrates an exemplary inlet cover.

According to the exemplary predetermined gas distribution positions of FIG. 8, the distributor belt 410 can be formed with one inlet cover 411 configured to cover a chamber inlet 220 and one vent 412 formed in the inlet cover 411. For reference, FIG. 9 illustrates an exemplary inlet cover, such as inlet cover 411. In some embodiments, four distributor belts 501, 502, 503 and 504 can connect to the inlet cover 411 through four inlet cover movement guides 505, 506, 507 and 508, respectively, that are formed into the inlet cover. While one end of each of the distributor belts 501, 502, 503 and 504 is connected to the inlet cover 411, the other end of each of the distributor belts 501, 502, 503 and 504 can be coupled to one or more pistons 430 configured to cause movement of the distributor belts 501, 502, 503 and 504. In some embodiments, the distributor belts 501, 502, 503 and 504 can be formed with dual layers, where a first layer of the distributor belt can move independently of a second layer of the distributor belt, as described in greater detail below.

Figure 10:
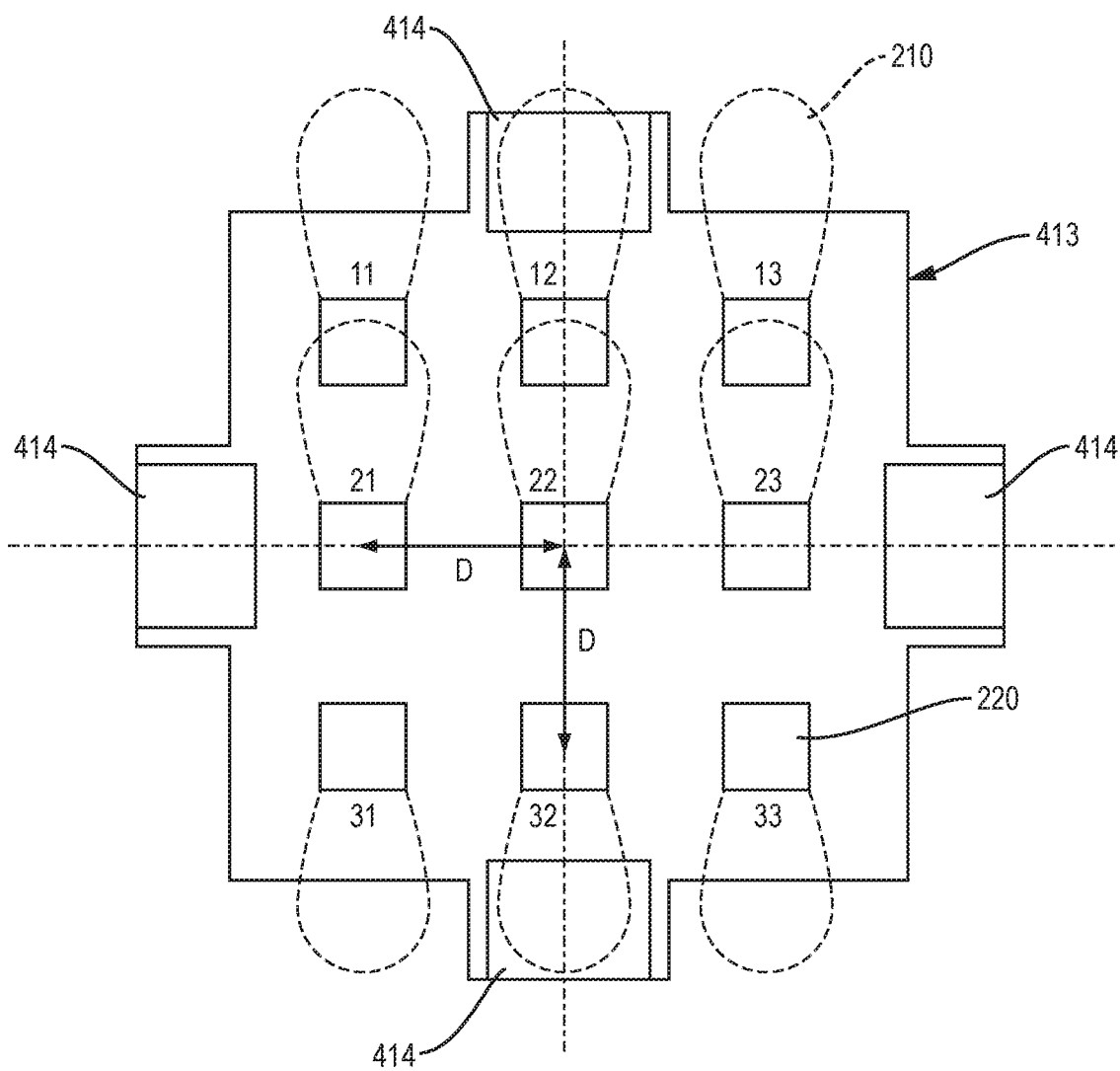
FIG. 10 illustrates an exemplary inlet matrix member.

Additionally, an inlet matrix member 413 through which gas produced by the airbag inflation device 300 flows to the chambers 210 of the airbag 200 can be disposed under the inlet cover 411. For reference, FIG. 10 illustrates an exemplary inlet matrix member, such as inlet matrix member 413. As shown in FIG. 10, the inlet matrix member 413 can include a plurality of inlets 220, such as inlets '11', '12', '13', '21', '22', '23', '31', '32' and '33', as shown in the example of FIG. 8. These inlets 220 can be arranged in various configurations, such as a 3×3 matrix. Moreover, distributor belt guide grooves 414 can be disposed at a portion of the inlet matrix member 413 in order to guide linear movement of the distributor belts 501, 502, 503 and 504 along the intended directions of movement. Referring still to FIG. 10, the distance between each pair of adjacent inlets 220 can be denoted as D. In this configuration, the one or more pistons 430 can move each of the distributor belts 501, 502, 503 and 504 a distance of 2*D.

Referring back to FIGS. 8 and 9, a plug member 416 can connect the aforementioned first layer of each distributor belt 501, 502, 503 and 504 to the aforementioned second layer of each distributor belt 501, 502, 503 and 504. The plug member 416 can be disposed so as to allow the first layer of each distributor belt 501, 502, 503 and 504 to move freely (by a maximum distance of 2*D) with respect to the second layer of each distributor belt 501, 502, 503 and 504. Furthermore, a distributor belt slip section 415 can be disposed between the first and second layers of each distributor belt 501, 502, 503 and 504. The distributor belt slip section 415 can facilitate movement of the respective first and second layers of the distributor belts 501, 502, 503 and 504, causing the vent 412 to move from one vent location (i.e., chamber inlet 220) to another vent location.

In some embodiments, movement of the distributor belts 501, 502, 503 and 504 can occur in two stages corresponding to the dual layers of each distributor belt. For example, in a first stage, a piston 430 can activate and move distributor belt 504 in the Y-direction, as shown in FIG. 8. This can cause the second layer of the distributor belt 504 to move distance D and come into contact with the first layer thereof through the plug member 416. As the distributor belt 504 moves in this "first stage," the opposing band 503 can be held in place without movement.

Next, in a second stage, as both layers of the distributor belt 504 have come into contact with each other, both layers of the distributor belt 504 can move distance D in the Y-direction. This secondary movement can cause the vent 412 to move from an original center position (corresponding to inlet '22') to a position in alignment with inlet '12', thus permitting gas produced by the airbag inflation device 300 to flow into the airbag chamber 210 corresponding to inlet '12'. As the distributor belt 504 moves in this "second stage," the secondary movement of the distributor belt 504 can cause the first layer of the opposing band 503 distance D in the Y-direction.

In the above example, the total displacement of the distributor belt 504 equals 2*D. The principles described above can apply to movement of any of the distributor belts 501, 502, 503 and 504 in any direction (e.g., X-direction, –X-direction, Y-direction, or –Y-direction). The control unit 500 can control the deployment location of the chambers 210 based upon a location of the collision with respect to the vehicle in a similar manner as described above with reference to FIGS. 6 and 7.

Notably, in increasingly complex systems with multiple airbags, such as the arrangement of FIG. 8, the distributor belt 410 and airbag connector 420 could be formed to include any number of vents 412 and chamber receptacles 422, respectively. Likewise, the chambers 210 of the passenger airbag 200 can be arranged in any suitable manner based on the desired passenger protection.

Figure 11:
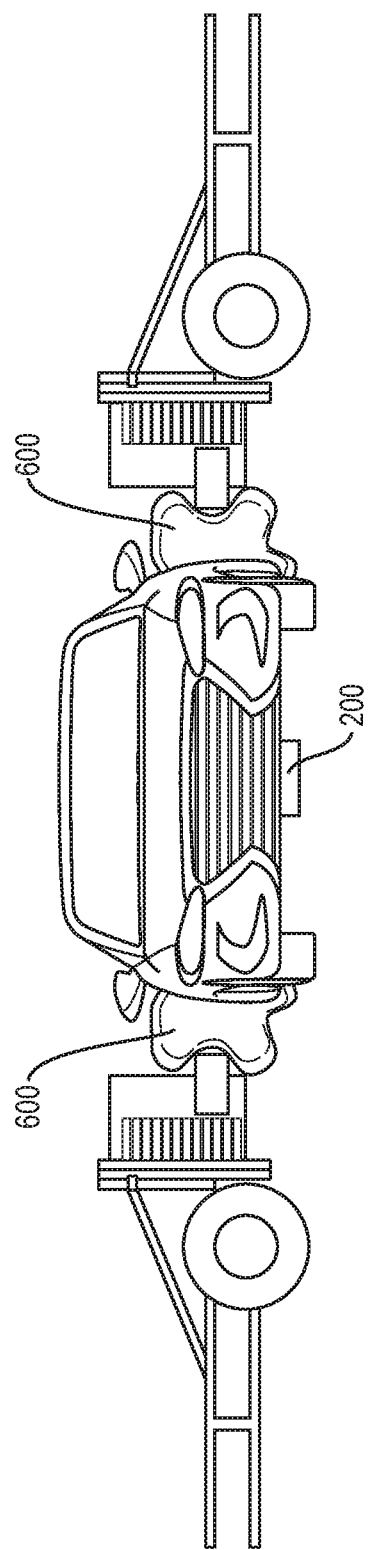
FIG. 11 is a simplified front view of a vehicle including external airbags controlled by the inflation gas distributor of FIG. 3.

FIG. 11 is a simplified front view of a vehicle including external airbags controlled by the inflation gas distributor 400. As shown in FIG. 11, the inflation gas distributor 400 can be adapted to control multi-airbag configurations, including both internal and external airbags, using a single inflation gas device 300. In some embodiments, the singular inflation gas device 300 can supply gas produced in the event of a collision to internal side airbags (not shown) on the driver- and/or passenger-side of the vehicle by forming the distributor belt 410 to support direct inflation of said airbags. In other embodiments, the singular inflation gas device 300 can supply gas produced in the event of a collision to external side airbags 600 on the driver- and/or passenger-side of the vehicle by forming the distributor belt 410 to support direct inflation of said airbags.

Accordingly, the airbag gas distributor discussed herein can reduce the risk of upper body injury, and most notably, head injury in the event of an oblique collision forcing a vehicle occupant in a lateral direction, as well as head-on collisions, rollovers, and so forth, by providing enhanced cushioning at the location of impact. Use of the disclosed airbag gas distributor can preclude the need to produce higher-output airbag inflators, which are costly and capable of producing additional safety concerns for the occupant. The disclosed airbag gas distributor can be adapted to traditionally designed airbag inflators, allowing for further minimization of installation costs as newly designed airbag inflators may be unnecessary.

While there have been shown and described illustrative embodiments that provide for the distribution of gas for airbag inflation, it is to be understood that various other adaptations and modifications may be made within the spirit and scope of the embodiments herein. For example, the embodiments have been primarily shown and described herein with relation to a particular arrangement of airbag chambers, chamber receptacles, and distributor belt vents. However, the embodiments in their broader sense are not as limited, as each of the aforementioned features can be modified in accordance with the preferences of the designer (e.g., based on desired passenger protection). Thus, the embodiments may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A gas distribution apparatus for airbag inflation in a vehicle including a passenger airbag with a plurality of inflatable chambers, each respective chamber having a chamber inlet in fluid communication with an interior of the respective chamber, the gas distribution apparatus comprising:
    an inflation gas distributor disposed at least partially between the passenger airbag and an airbag inflation device that is configured to produce a gas when a collision involving the vehicle is sensed and to supply the gas to the passenger airbag, causing deployment of the passenger airbag, the inflation gas distributor including a rotatable distributor belt; and
    a control unit in operative communication with the inflation gas distributor and a plurality of collision sensors disposed in or around the vehicle, wherein
    the inflation gas distributor is configured to allow passage of the gas from the airbag inflation device to a first subset of the plurality of chambers, and to impede passage of the gas from the airbag inflation device to a second subset of the plurality of chambers, by rotating the distributor belt to a gas distribution position selected among a plurality of predetermined gas distribution positions, and
    the control unit is configured to select the gas distribution position among the plurality of predetermined gas distribution positions based on collision data relating to the collision acquired by the plurality of collision sensors, and to control operation of the inflation gas distributor, causing the rotation of the distributor belt to the selected gas distribution position,
    wherein the inflation gas distributor further includes one or more pistons operatively coupled to the distributor belt, the one or more pistons configured to cause the rotation of the distributor belt.

2. The gas distribution apparatus of claim 1, wherein the inflation gas distributor is configured to allow the passage of the gas from the airbag inflation device to the first subset of chambers by creating one or more flow paths between the airbag inflation device and the chamber inlet of each chamber in the first subset of chambers through the distributor belt, and to impede the passage of the gas from the airbag inflation device to the second subset of chambers by blocking one or more flow paths between the airbag inflation device and the chamber inlet of each chamber in the second subset of chambers.

3. The gas distribution apparatus of claim 2, wherein
    the distributor belt includes one or more vents formed therein, and
    the distributor belt is configured to rotate such that the one or more vents are aligned with the chamber inlet of each chamber in the first subset of chambers, thereby creating the one or more flow paths between the airbag inflation device and the chamber inlet of each chamber in the first subset of chambers, and such that a portion of the distributor belt without a vent formed therein is aligned with the chamber inlet of each chamber in the second subset of chambers, thereby blocking the one or more flow paths between the airbag inflation device and the chamber inlet of each chamber in the second subset of chambers.

4. The gas distribution apparatus of claim 1, wherein the inflation gas distributor further includes an airbag connector at least partially surrounding the distributor belt, such that the distributor belt is at least partially sandwiched between the airbag connector and the airbag inflation device, the airbag connector connecting to the plurality of chambers of the passenger airbag.

5. The gas distribution apparatus of claim 4, wherein
    the airbag connector includes a plurality of chamber receptacles, each of which configured to receive one chamber of the plurality of chambers, and
    the plurality of chambers are disposed in the airbag connector such that the chamber inlet of each of the plurality of chambers is positioned so as to receive the gas from the airbag inflation device.

6. The gas distribution apparatus of claim 5, wherein
    the distributor belt includes one or more vents formed therein, and
    the inflation gas distributor is configured to allow passage of the gas from the airbag inflation device to the first subset of chambers and to impede passage of the gas from the airbag inflation device to the second subset of the plurality of chambers, by rotating the distributor belt such that each chamber receptacle containing a chamber in the first subset of chambers is aligned with a vent of the one or more vents, and such that each chamber receptacle containing a chamber in the second subset of chambers is aligned with a portion of the distributor belt without a vent formed therein.

7. The gas distribution apparatus of claim 5, wherein
    the plurality of chamber receptacles are arranged in a 1×n array, where n is two or more, and
    the inflation gas distributor further includes the one or more pistons operatively coupled to the distributor belt, the one or more pistons configured to cause movement of the distributor belt in an x-direction only.

8. The gas distribution apparatus of claim 5, wherein the plurality of chamber receptacles are arranged in a m×n array, where m is two or more, and n is two or more, and the inflation gas distributor further includes the one or more pistons operatively coupled to the distributor belt, the one or more pistons configured to cause movement of the distributor belt in an x-direction and a y-direction.

9. The gas distribution apparatus of claim 4, wherein the airbag connector is configured to remain stationary during the rotation of the distributor belt.

10. The gas distribution apparatus of claim 1, wherein the control unit is configured to actuate the one or more pistons operatively coupled to the distributor belt so as to cause the rotation of the distributor belt to the selected gas distribution position.

11. The gas distribution apparatus of claim 1, wherein the plurality of predetermined gas distribution positions include:

a first gas distribution position in which the inflation gas distributor allows passage of the gas from the airbag inflation device to one or more chambers including a chamber disposed in a leftmost location among the plurality of chambers, a second gas distribution position in which the inflation gas distributor allows passage of the gas from the airbag inflation device to one or more chambers including a chamber disposed in a rightmost location among the plurality of chambers, and a third gas distribution position in which the inflation gas distributor allows passage of the gas from the airbag inflation device to one or more chambers including a chamber disposed in a middle location among the plurality of chambers.

12. The gas distribution apparatus of claim 11, wherein the control unit is configured to select the first gas distribution position when the collision data acquired by the plurality of collision sensors indicates that a front-left oblique collision has occurred, to select the second gas distribution position when the collision data acquired by the plurality of collision sensors indicates that a front-right oblique collision has occurred, and to select the third gas distribution position when the collision data acquired by the plurality of collision sensors indicates that a frontal collision has occurred.

13. The gas distribution apparatus of claim 1, wherein each of the predetermined gas distribution positions corresponds to a unique configuration of the first subset of the plurality of chambers and the second subset of the plurality of chambers.

14. The gas distribution apparatus of claim 1, wherein the inflation gas distributor is configured to control the gas supplied from the airbag inflation device such that only the first subset of chambers is directly inflated by the airbag inflation device.

15. The gas distribution apparatus of claim 14, wherein the second subset of chambers is indirectly inflated by the airbag inflation device due to flow of the gas from the first subset of chambers through one or more vents disposed between the plurality of chambers to the second subset of chambers.

16. The gas distribution apparatus of claim 1, wherein the distributor belt includes one or more vents formed therein, through which the gas passes from the airbag inflation device to the first subset of the plurality of chambers, and a total number of chambers of the plurality of chambers is greater than a total number of vents of the one or more vents.

17. The gas distribution apparatus of claim 1, wherein, when the first subset of chambers is deployed, due to passage of the gas from the airbag inflation device to the first subset of the plurality of chambers, a deployment location of the first subset of chambers corresponds to a location of the collision with respect to the vehicle.

18. A gas distribution method for airbag inflation in a vehicle including a passenger airbag with a plurality of inflatable chambers, each respective chamber having a chamber inlet in fluid communication with an interior of the respective chamber, the gas distribution method comprising:

sensing a collision involving the vehicle using a plurality of sensors disposed in or around the vehicle, upon which an airbag inflation device produces a gas and supplies the gas to the passenger airbag, causing deployment of the passenger airbag;

acquiring collision data relating to the collision using the plurality of sensors;

selecting a gas distribution position among a plurality of predetermined gas distribution positions based on the acquired collision data; and controlling operation of an inflation gas distributor disposed at least partially between the airbag inflation device and the passenger airbag, causing rotation of a distributor belt to the selected gas distribution position, such that the inflation gas distributor allows passage of the gas from the airbag inflation device to a first subset of the plurality of chambers, and impedes passage of the gas from the airbag inflation device to a second subset of the plurality of chambers, wherein the inflation gas distributor further includes one or more pistons operatively coupled to the distributor belt, the one or more pistons configured to cause the rotation of the distributor belt.

19. A gas distribution system for airbag inflation in a vehicle, the gas distribution system comprising:

a passenger airbag for use in the vehicle, the passenger airbag including a plurality of inflatable chambers, each respective chamber having a chamber inlet in fluid communication with an interior of the respective chamber;

an airbag inflation device configured to produce a gas when a collision involving the vehicle is sensed and to supply the gas to the passenger airbag, causing deployment of the passenger airbag;

an inflation gas distributor disposed at least partially between the airbag inflation device and the passenger airbag, the inflation gas distributor including a rotatable distributor belt, the inflation gas distributor configured to allow passage of the gas from the airbag inflation device to a first subset of the plurality of chambers, and to impede passage of the gas from the airbag inflation device to a second subset of the plurality of chambers, by rotating the distributor belt to a gas distribution position selected among a plurality of predetermined gas distribution positions; and a control unit in operative communication with the inflation gas distributor and a plurality of collision sensors disposed in or around the vehicle, the control unit configured to select the gas distribution position among the plurality of predetermined gas distribution positions based on collision data relating to the collision acquired by the plurality of collision sensors, and to control operation of the inflation gas distributor, causing the rotation of the distributor belt to the selected gas distribution position, wherein the control unit is configured to actuate one or more pistons operatively coupled to the distributor belt so as to cause the rotation of the distributor belt to the selected gas distribution position.

* * * * *